US012112091B2

(12) United States Patent
Naseef et al.

(10) Patent No.: US 12,112,091 B2
(45) Date of Patent: Oct. 8, 2024

(54) UNIFYING MULTIPLE AUDIO BUS INTERFACES IN AN AUDIO SYSTEM

(71) Applicant: QUALCOMM Incorporated, San Diego, CA (US)

(72) Inventors: Syed Naseef, Hyderabad (IN); David Belz, Raanana (IL)

(73) Assignee: QUALCOMM Incorporated, San Diego, CA (US)

( * ) Notice: Subject to any disclaimer, the term of this patent is extended or adjusted under 35 U.S.C. 154(b) by 54 days.

(21) Appl. No.: 18/178,010

(22) Filed: Mar. 3, 2023

(65) Prior Publication Data

US 2024/0296009 A1 Sep. 5, 2024

(51) Int. Cl.
*G06F 3/16* (2006.01)
*G06F 13/362* (2006.01)

(52) U.S. Cl.
CPC ............ *G06F 3/162* (2013.01); *G06F 13/362* (2013.01)

(58) Field of Classification Search
CPC .............................. G06F 3/163; G06F 13/162
See application file for complete search history.

(56) References Cited

U.S. PATENT DOCUMENTS

| 10,136,223 | B1* | 11/2018 | Chen ...................... H04R 5/04 |
| 10,482,056 | B2 | 11/2019 | Amarilio et al. |
| 10,963,213 | B2* | 3/2021 | Cheng .................... G06F 3/162 |
| 11,704,086 | B2* | 7/2023 | Amarilio ............. G06F 13/3625 |
| | | | 700/94 |
| 2012/0259612 | A1* | 10/2012 | Lyons ..................... G06F 3/162 |
| | | | 703/21 |
| 2017/0230750 | A1* | 8/2017 | Pawlowski .............. H04R 1/08 |
| 2018/0373659 | A1* | 12/2018 | Amarilio ................... G06F 1/12 |
| 2019/0361832 | A1 | 11/2019 | Huang et al. |
| 2020/0019523 | A1* | 1/2020 | Amarilio ............. G06F 13/4022 |

FOREIGN PATENT DOCUMENTS

WO    2019104073 A1    5/2019

OTHER PUBLICATIONS

International Search Report and Written Opinion for International Patent Application No. PCT/US2024/011380, mailed May 7, 2024, 12 pages.

* cited by examiner

*Primary Examiner* — Henry Tsai
*Assistant Examiner* — Christopher A Daley
(74) *Attorney, Agent, or Firm* — W&T/Qualcomm

(57) ABSTRACT

Systems and methods for unifying multiple audio bus interfaces in an audio system are disclosed herein. In one aspect, an integrated circuit (IC) comprises a primary slave audio device comprising a first control circuit, and a dependent slave audio device comprising a second control circuit. The primary slave audio device and the dependent slave audio device are communicatively coupled via a slave status link, and the first control circuit and the second control circuit each configured to receive, from a master audio device, a mode instruction that indicates operation in one of a detach mode and a unify mode. The second control circuit is configured to, while operating in the detach mode, transmit a slave status to the master audio device via a second control lane, and, while operating in the unify mode, transmit the slave status to the primary slave audio device via the slave status link.

22 Claims, 11 Drawing Sheets

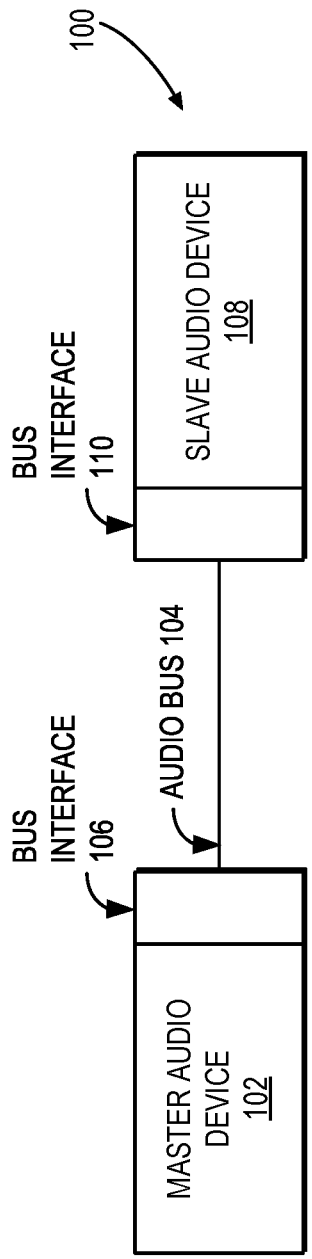
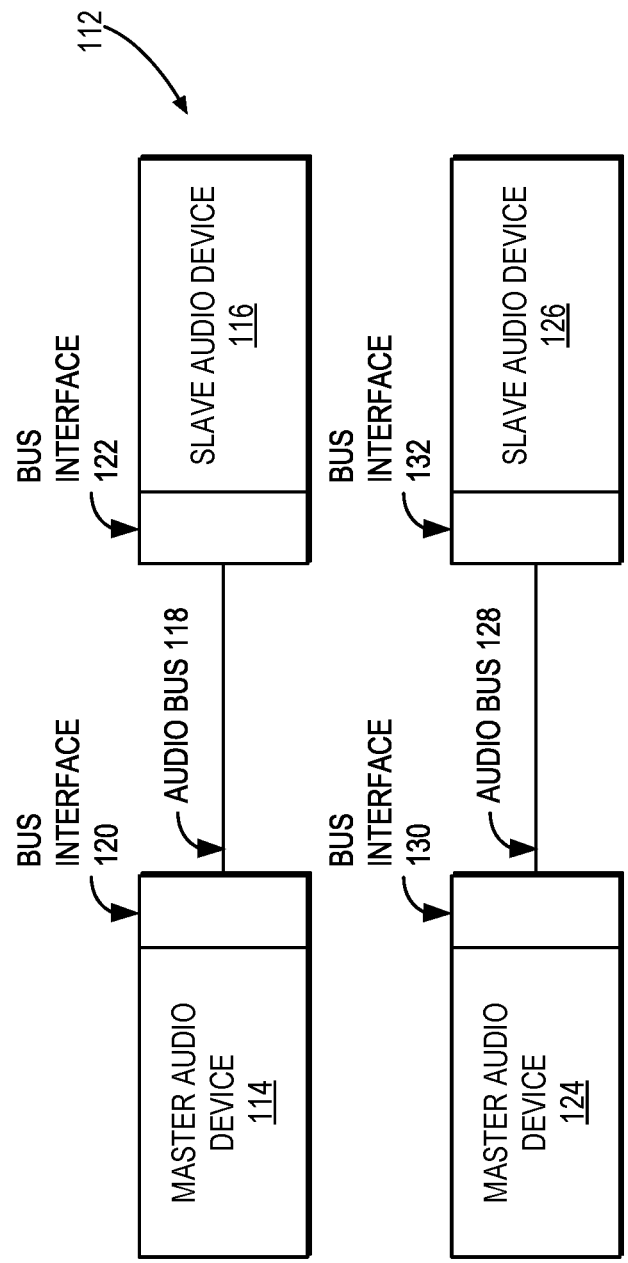

UNIFYING MULTIPLE AUDIO BUS INTERFACES IN AN AUDIO SYSTEM

BACKGROUND

I. Field of the Disclosure

The technology of the disclosure relates generally to audio systems, more particularly to SOUNDWIRE audio systems, and still more particularly to audio bus interfaces using the SOUNDWIRE protocol.

II. Background

Mobile communication devices have become increasingly common in current society. The prevalence of these mobile communication devices is driven in part by the many functions that are now enabled on such devices. Increased processing capabilities in such devices mean that mobile communication devices have evolved from pure communication tools into sophisticated mobile entertainment centers, thus enabling enhanced user experiences. Such mobile communication devices commonly include at least one microphone and multiple speakers, which typically have analog interfaces that require a dedicated two-wire connection between each pair of devices. Since a mobile communication device is capable of supporting multiple audio devices, it may be desirable to allow a microprocessor or other control device in the mobile communication device to communicate audio data to multiple audio devices over a common communication bus simultaneously.

In this regard, the MIPI® Alliance initially developed the Serial Low-power Inter-chip Media Bus (SLIMbusSM or SLIMBUS) to handle audio signals within a mobile communication device. The first release was published in October 2005 with v1.01 released on Dec. 3, 2008. In response to industry feedback, MIPI has also developed SoundWireSM (SOUNDWIRE), a communication protocol for a processor in the mobile communication device (the "master") to control distribution of digital audio streams between one or more audio devices (the "slave(s)") via one or more SOUNDWIRE slave data ports. Version 1 was released Jan. 21, 2015. Version 1.2 was released April 2019 and the standard continues to evolve, necessitating further innovation associated therewith. Version 1.4 is currently under discussion by members of MIPI.

Some conventional implementations of SOUNDWIRE audio devices may employ two separate SOUNDWIRE links, with a first SOUNDWIRE master audio device and slave audio device pair handling data transmission and a second SOUNDWIRE master audio device and slave audio device pair for handling data reception. However, some computing platforms may require the use of only a single SOUNDWIRE link, which makes the use of multiple pairs of SOUNDWIRE devices unfeasible. This issue could be addressed by increasing the number of ports provided by each SOUNDWIRE device, but this approach would increase the physical size, power consumption, and integration complexity of such a device, which may be undesirable.

SUMMARY OF THE DISCLOSURE

Aspects disclosed in the detailed description include systems and methods for unifying multiple audio bus interfaces in an audio system. In this regard, an audio system provides a plurality of slave audio devices, one of which is designated as a "primary slave audio device" and the others as "dependent slave audio device(s)." The primary slave audio device and the dependent slave audio device(s) can be selectively configured to operate in either a unify mode or a detach mode. In the unify mode, the primary slave audio device and the dependent slave audio device(s) are configured to communicate with a single master audio device using a single audio bus interface. The primary slave audio device performs functionality for aggregating status information (e.g., slave status and/or interrupt status, as non-limiting examples) from the dependent slave audio device(s), and communicates such status information to the master audio device on behalf of the dependent slave audio device(s). Each of the dependent slave audio device(s) transmits status information to the primary slave audio device instead of to the master audio device, and may also use a port offset and/or a physical layer offset to cause ports, port configuration registers, physical layer (PHY) elements, and/or physical layer configuration registers of the dependent slave audio device to appear to be contiguous with corresponding elements of the primary slave audio device. In detach mode, the audio bus interfaces of the primary slave audio device and the dependent slave audio device(s) operate independently in a manner similar to conventional operation, allowing each to be connected to different master audio devices. In this manner, exemplary aspects of the present disclosure provide a way to unify or detach slave audio devices such as SOUNDWIRE devices, which enables support for different computing platform requirements without incurring additional physical area or power consumption.

In another aspect, an integrated circuit (IC) is provided. The IC comprises a primary slave audio device that includes a first control circuit, and a first audio bus interface comprising a first control lane and a first plurality of data lanes. The IC also comprises a dependent slave audio device that includes a second control circuit, and a second audio bus interface comprising a second control lane and a second plurality of data lanes. The primary slave audio device and the dependent slave audio device are communicatively coupled via a slave status link, and the first control circuit and the second control circuit each configured to receive, from a master audio device, a mode instruction that indicates operation in one of a detach mode and a unify mode. The second control circuit is configured to, while operating in the detach mode, transmit a slave status for the dependent slave audio device to the master audio device via the second control lane. The second control circuit is further configured to, while operating in the unify mode, transmit the slave status for the dependent slave audio device to the primary slave audio device via the slave status link.

In another aspect, a method for unifying multiple audio bus interfaces is provided. The method comprises receiving, by a control circuit of a dependent slave audio device from a master audio device, a first mode instruction that indicates operation in a unify mode. The method further comprises, while operating in the unify mode, transmitting, by the control circuit, a first slave status for the dependent slave audio device to a primary slave audio device via a slave status link communicatively coupling the dependent slave audio device and the primary slave audio device.

In another aspect, a method for unifying multiple audio bus interfaces is provided. The method comprises receiving, by a control circuit of a primary slave audio device from a master audio device, a mode instruction that indicates operation in a unify mode. The method further comprises, while operating in the unify mode, receiving, by the control circuit, a slave status for a dependent slave audio device via a slave status link communicatively coupling the dependent slave audio device and the primary slave audio device. The method also comprises transmitting, by the control circuit, the slave status for the dependent slave audio device and a slave status for the primary slave audio device to the master audio device via a control lane of the primary slave audio device.

BRIEF DESCRIPTION OF THE FIGURES

FIGS. 1A and 1B are block diagrams of exemplary topologies of audio systems in different configurations using one (1) or two (2) audio buses such as the SOUNDWIRE audio bus;

DETAILED DESCRIPTION

Figure 2A:
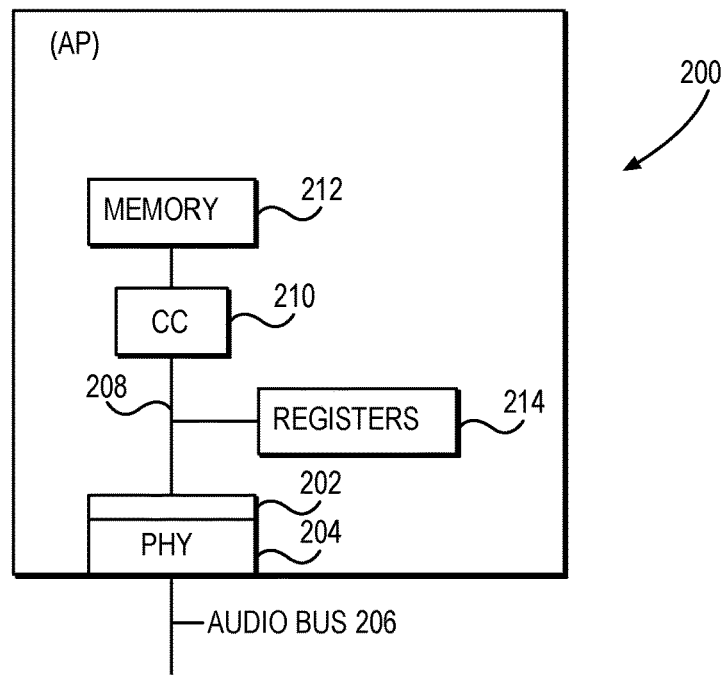
FIGS. 2A and 2B are block diagrams of a master audio device and a slave audio device, respectively, from one of the configurations of FIGS. 1A and 1B.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include systems and methods for unifying multiple audio bus interfaces in an audio system. In this regard, an audio system provides a plurality of slave audio devices, one of which is designated as a "primary slave audio device" and the others as "dependent slave audio device(s)." The primary slave audio device and the dependent slave audio device(s) can be selectively configured to operate in either a unify mode or a detach mode. In the unify mode, the primary slave audio device and the dependent slave audio device(s) are configured to communicate with a single master audio device using a single audio bus interface. The primary slave audio device performs functionality for aggregating status information (e.g., slave status and/or interrupt status, as non-limiting examples) from the dependent slave audio device(s), and communicates such status information to the master audio device on behalf of the dependent slave audio device(s). Each of the dependent slave audio devices transmits status information to the primary slave audio device instead of to the master audio device, and may also use a port offset and/or a physical layer offset to cause ports, port configuration registers, physical layer (PHY) elements, and/or physical layer configuration registers of the dependent slave audio device to appear to be contiguous with corresponding elements of the primary slave audio device. In detach mode, the audio bus interfaces of the primary slave audio device and the dependent slave audio device(s) operate independently in a manner similar to conventional operation, allowing each to be connected to different master audio devices. In this manner, exemplary aspects of the present disclosure provide a way to unify or detach slave audio devices such as SOUNDWIRE devices, which enables support for different computing platform requirements without incurring additional physical area or power consumption.

The present disclosure is well suited for use in a next generation SOUNDWIRE audio system such as that set forth in the draft specification for SOUNDWIRE-13S v0.4r08 dated Jan. 23, 2020, or v0.4r09, copies of which are available to MIPI members. Such an audio system relies on a differential audio bus having at least two conductors (DP (data positive), DN (data negative)) for each lane. There may be up to eight (8) lanes (i.e., up to sixteen conductors) in such a bus. Before addressing particular aspects of the present disclosure in greater detail beginning with reference to FIG. 3 below, an overview of different audio system configurations are presented in FIGS. 1A and 1B, and block diagrams for master audio devices and slave audio devices are presented in FIGS. 2A and 2B, respectively.

In this regard, FIG. 1A illustrates a first audio system 100 comprising a master audio device 102 that is coupled to an audio bus 104 via a bus interface 106, as well as a slave audio device 108 that is coupled to the audio bus 104 via a bus interface 110. The audio bus 104 in some aspects may be a differential audio bus, and may extend along a broadly linear signal path on a physical medium. The audio bus 104 may be coupled to additional slave audio devices (not shown) in various topologies and at varying distances from the master audio device 102.

FIG. 1B illustrates a second audio system 112 that may be employed in, e.g. . . . mobile computing platforms, in which more than one audio bus and corresponding bus interfaces are used. As seen in FIG. 1B, a first master audio device 114 and a first slave audio device 116 are coupled to a first audio bus 118 via respective bus interfaces 120 and 122, while a second master audio device 124 and a second slave audio device 126 are coupled to a second audio bus 128 via respective bus interfaces 130 and 132. The configuration illustrated in FIG. 1B may be used in implementations in which the first audio bus 118 and the second audio bus 128 each carry data in different directions. For example, the first audio bus 118 may be used to carry data transmitted by a microphone, while the second audio bus 128 may be used to carry data received by a speaker.

An exemplary master audio device, such as the master audio devices 102, 114, and 124 of FIGS. 1A and 1B, are illustrated in greater detail in FIG. 2A, where a block diagram of a master audio device 200 is provided. The master audio device 200 may be an application processor (AP) as shown in FIG. 1A, or may be a codec (not shown), a mobile device modem (MDM) (not shown), a digital signal processor (DSP) (not shown), or the like. The master audio device 200 may further include a bus interface 202 that may be or may work with a physical layer (PHY) element (captioned as "PHY" in FIG. 2A) 204 that is configured to couple to an audio bus 206, which corresponds in functionality to the audio buses 104, 118, and 128 of FIGS. 1A and 1B. As the bus interface 202 may interoperate with an audio bus, the bus interface 202 may be referred to as an audio bus interface. The master audio device 200 may include an internal bus 208 that couples a master control circuit (captioned as "CC" in FIG. 2A) 210 to the PHY element 204 as well as a memory 212 and/or registers 214.

Figure 2B:
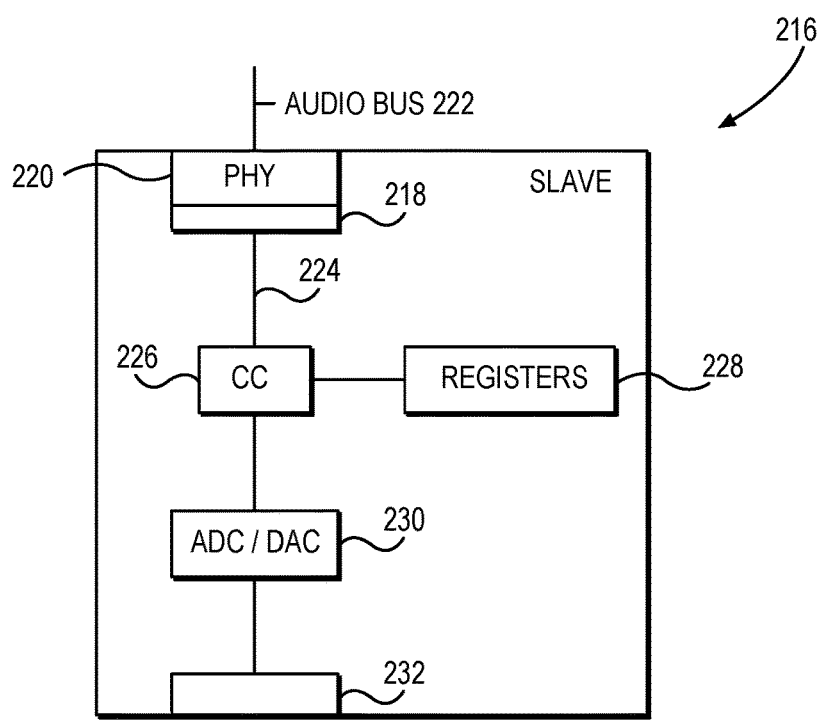

FIG. 2B provides a block diagram of an exemplary slave audio device 216, which corresponds to the slave audio devices 108, 116, and 126 of FIGS. 1A and 1B. The slave audio device 216 may be a microphone, a speaker, a codec, a DSP, or the like. The slave audio device 216 may include a bus interface 218 that may be or may work with a PHY element (captioned as "PHY" in FIG. 2B) 220 that is configured to couple to an audio bus 222, which corresponds in functionality to the audio buses 104, 118, and 128 of FIGS. 1A and 1B. The slave audio device 216 may include an internal bus 224 that couples a slave control circuit (captioned as "CC" in FIG. 2B) 226 to the PHY 220 as well as registers 228. Further, the slave audio device 216 may include a digital-to-analog converter (DAC) or analog-to-digital converter (ADC) (captioned as "ADC/DAC" in FIG. 2B) 230, which may couple to an input or output element 232.

As discussed above, some conventional implementations of SOUNDWIRE audio devices may employ two separate SOUNDWIRE links in the manner illustrated in FIG. 1B. However, some computing platforms may require the use of only a single SOUNDWIRE link, which makes the use of multiple pairs of SOUNDWIRE devices unfeasible. Accordingly, some exemplary aspects disclosed herein provide mechanisms for unifying multiple audio bus interfaces such as SOUNDWIRE in an audio system. In such aspects, the audio system provides a single audio bus (e.g., a SOUNDWIRE bus) that is used to connectively couple a master audio device to multiple slave audio devices. One of the slave audio devices is designated as a "primary slave audio device," while the remaining slave audio device(s) are designated as "dependent slave audio device(s)." The primary slave audio device and the dependent slave audio device(s) can be selectively configured to operate in either a unify mode or a detach mode. In the unify mode, the primary slave audio device and the dependent slave audio device(s) are connected to a single master audio device by a single audio bus, and are configured to communicate with the master audio device via a single audio bus interface. The primary slave audio device performs functionality for aggregating status information from the dependent slave audio device(s), and communicates such status information to the master audio device on behalf of the dependent slave audio device(s). In detach mode, the audio bus interfaces of the primary slave audio device and the dependent slave audio device(s) operate independently in a manner similar to conventional operation, allowing each to be connected to different master audio devices.

Figure 3:
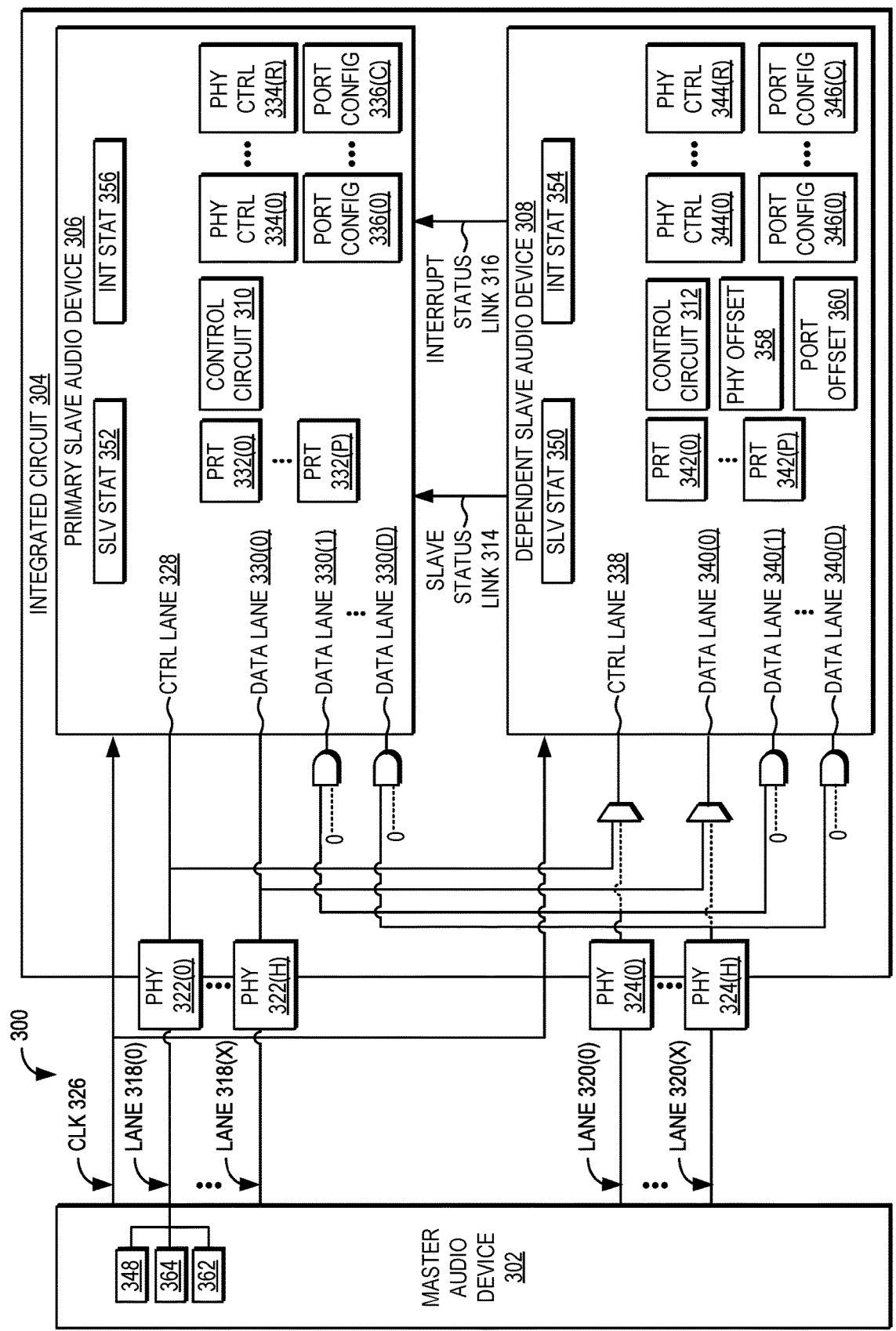
FIG. 3 is a block diagram illustrates an audio system including a primary slave audio device and a dependent slave audio device configured to operate in a unify mode, in which both communicate with a single master audio device using a single audio bus interface, according to some aspects.

To illustrate an audio system including a primary slave audio device and a dependent slave audio device that are configured to operation in a unify mode, FIG. 3 is provided. In FIG. 3, an audio system 300 includes a master audio device 302 that is communicatively coupled to an integrated circuit (IC) 304 that comprises a primary slave audio device 306 and a dependent slave audio device 308. The primary slave audio device 306 includes a control circuit 310 for controlling functionality of the primary slave audio device 306, while the dependent slave audio device 308 includes a control circuit 312 for controlling functionality of the dependent slave audio device 308. As seen in FIG. 3, the primary slave audio device 306 and the dependent slave audio device 308 are communicatively coupled to each other via a slave status link 314 and an interrupt status link 316, each of which comprises a communications line or bus. It is to be understood that, although only a single dependent slave audio device 308 is illustrated in FIG. 3, some aspects may provide that the IC 304 comprises multiple dependent slave audio devices 308, each of which is configured to provide functionality similar to that attributed herein to the dependent slave audio device 308.

The IC 304 is communicatively coupled to the master audio device 302 by a plurality of communication lanes (captioned as "LANE" in FIG. 3) 318(0)-318(X), 320(0)-320(X) via corresponding plurality of PHY elements (captioned as "PHY" in FIG. 3) 322(0)-322(H), 324(0)-324(H). The primary slave audio device 306 and the dependent slave audio device 308 are also communicatively coupled to a same clock line (captioned as "CLK" in FIG. 3) 326 through which the primary slave audio device 306 and the dependent slave audio device 308 receive clock signals (not shown) from the master audio device 302. The communication lanes 318(0)-318(X), 320(0)-320(X) and the clock line 326 may collectively be referred to as an "audio bus," and may comprise, e.g., a SOUNDWIRE audio bus.

In the example of FIG. 3, the communication lane 318(0) operates as a control lane (captioned as "CTRL LANE" in FIG. 3) 328 for the primary slave audio device 306, while the communication lane 318(X) operates as a data lane 330(0) of a plurality of data lanes 330(0)-330(D) for the primary slave audio device 306. The primary slave audio device 306 further includes a plurality of ports (captioned as "PRT" in FIG. 3) 332(0)-332(P), one or more of which may be configurable connected to the control lane 328 and/or the data lanes 330(0)-330(D) to send and/or receive data. The primary slave audio device 306 also provides PHY control registers (captioned as "PHY CTRL" in FIG. 3) 334(0)-334(R) that may be set to modify the configuration of the PHY elements 322(0)-322(H), and also includes port configuration registers (captioned as "PORT CONFIG" in FIG. 3) 336(0)-336(C) that may be set to modify the configuration of the ports 332(0)-332(P).

Similarly, the communication lane 318(0) operates as a control lane (captioned as "CTRL LANE" in FIG. 3) 338 for the dependent slave audio device 308, while the communication lane 318(X) operates as a data lane 340(0) of a plurality of data lanes 340(0)-340(D) for the dependent slave audio device 308. The dependent slave audio device 308 further includes a plurality of ports (captioned as "PRT" in FIG. 3) 342(0)-342(P), one or more of which may be configurable connected to the control lane 338 and/or the data lanes 340(0)-340(D) to send and/or receive data. The dependent slave audio device 308 further provides PHY control registers (captioned as "PHY CTRL" in FIG. 3) 344(0)-344(R) that may be set to modify the configuration of the PHY elements 324(0)-324(H), and also includes port configuration registers (captioned as "PORT CONFIG" in FIG. 3) 346(0)-346(C) that may be set to modify the configuration of the ports 342(0)-342(P).

In exemplary operation, the control circuit 310 of the primary slave audio device 306 and the control circuit 312 of the dependent slave audio device 308 may receive a mode instruction 348 from the master audio device 302 that indicates operation in either a unify mode or a detach mode. Note that, as seen in FIG. 3, the dependent slave audio device 308 may be configured to monitor or sample the communication lane 318(0) operating as the control lane 328 of the primary slave audio device 306, and thus can detect and respond to instructions from the master audio device 302 directed to the dependent slave audio device 308. In the example of FIG. 3, the mode instruction 348 indicates that the primary slave audio device 306 and the dependent slave audio device 308 are to operate in the unify mode, and thus the control circuit 310 and the control circuit 312 sets an operating mode of the primary slave audio device 306 and the dependent slave audio device 308, respectively, to the unify mode.

While the dependent slave audio device 308 is operating in the unify mode, both the primary slave audio device 306 and the dependent slave audio device 308 receive the same clock signal from the clock line 326, and both sample the communication lane 318(0) as respective control lanes 328 and 338 and sample the communication lane 318(X) as respective data lanes 330(0) and 340(0). The primary slave audio device 306 and the dependent slave audio device 308 are also both configured with a same unique ID (not shown) when operating in the unify mode.

The control circuit 312 of the dependent slave audio device 308 is configured to transmit a slave status (captioned as "SLV STAT" in FIG. 3) 350 for the dependent slave audio device 308 to the primary slave audio device 306 via the slave status link 314 (i.e., rather than transmitting the slave status 350 to the master audio device 302 itself). The slave status 350 may indicate, e.g., an attach status, a deattach status, or an alert status, as non-limiting examples, of the dependent slave audio device 308. Upon receiving the slave status 350 for the dependent slave audio device 308, the control circuit 310 of the primary slave audio device 306 aggregates the slave status 350 with a slave status (captioned as "SLV STAT" in FIG. 3) 352 for the primary slave audio device 306, and transmits both (i.e., in appropriate locations within a bus frame (not shown)) to the master audio device 302 via the control lane 328 of the primary slave audio device 306.

Some aspects may also provide that, in the unify mode, the control circuit 312 of the dependent slave audio device 308 may also transmit an interrupt status (captioned as "INT STAT" in FIG. 3) 354 for the dependent slave audio device 308 to the primary slave audio device 306 via the interrupt status link 316. When the interrupt status 354 is received by the control circuit 310 of the primary slave audio device 306 via the interrupt status link 316, the control circuit 310 transmits the interrupt status 354 for the dependent slave audio device 308 and an interrupt status (captioned as "INT STAT" in FIG. 3) 356 for the primary slave audio device 306 to the master audio device 302 via the control lane 328.

With continuing reference to FIG. 3, according to some aspects, the dependent slave audio device 308 is associated with a physical layer offset (captioned as "PHY OFFSET" in FIG. 3) 358 that may be used to enable the PHY elements 324(0)-324(H) and the physical layer control registers 344(0)-344(R) of the dependent slave audio device 308 to appear to the master audio device 302 to be contiguous with the PHY elements 322(0)-322(H) and the PHY control registers 334(0)-334(R), respectively, of the primary slave audio device 306 when operating in the unify mode. Thus, for example, if the primary slave audio device 306 includes two (2) PHY elements 322(0) and 322(1) that are referenced using index values zero (0) and one (1) (i.e., PHY0 and PHY1), the control circuit 312 may configure the physical layer offset 358 to a value of two (2), and may add the physical layer offset 358 to index values for the PHY elements 324(0) and 324(1) (i.e., referring to them as PHY2 and PHY3) when referencing the PHY elements 324(0) and 324(1) so that they appear to be contiguous with the PHY elements 322(0) and 322(1). In similar fashion, the dependent slave audio device 308 in some aspects is associated with a port offset 360 that that may be used to enable the ports 342(0)-342(P) and the port configuration registers 346(0)-346(C) of the dependent slave audio device 308 to appear to the master audio device 302 to be contiguous with the ports 332(0)-332(P) and the port configuration registers 336(0)-336(C), respectively, of the primary slave audio device 306 when operating in the unify mode.

In some aspects, the data lanes 330(0)-330(D) of the primary slave audio device 306 may be configurably associated with different ones of the ports 332(0)-332(P), and likewise the data lanes 340(0)-340(D) of the dependent slave audio device 308 may be configurably associated with different ones of the ports 342(0)-342(P). In such aspects, the control circuit 310 of the primary slave audio device 306 may receive register configuration instructions 362 from the master audio device 302 via the control lane 328 of the primary slave audio device 306. The control circuit 310 sets the port configuration registers 336(0)-336(C) based on corresponding register configuration instructions 362 received on the control lane 328 from the master audio device 302. The control circuit 310 may then associate one or more of the ports 332(0)-332(P) with a data lane of the plurality of data lanes 330(0)-330(D) of the primary slave audio device 306 based on the plurality of port configuration registers 336(0)-336(C). In similar fashion, the control circuit 312 of the dependent slave audio device 308 may receive register configuration instructions 364 from the master audio device 302 via the control lane 328 of the primary slave audio device 306. The control circuit 312 may then associate, one or more of the ports 342(0)-342(P) with a data lane of the plurality of data lanes 340(0)-340(D) of the dependent slave audio device 308, based on the plurality of port configuration registers 346(0)-346(C).

Figure 4:
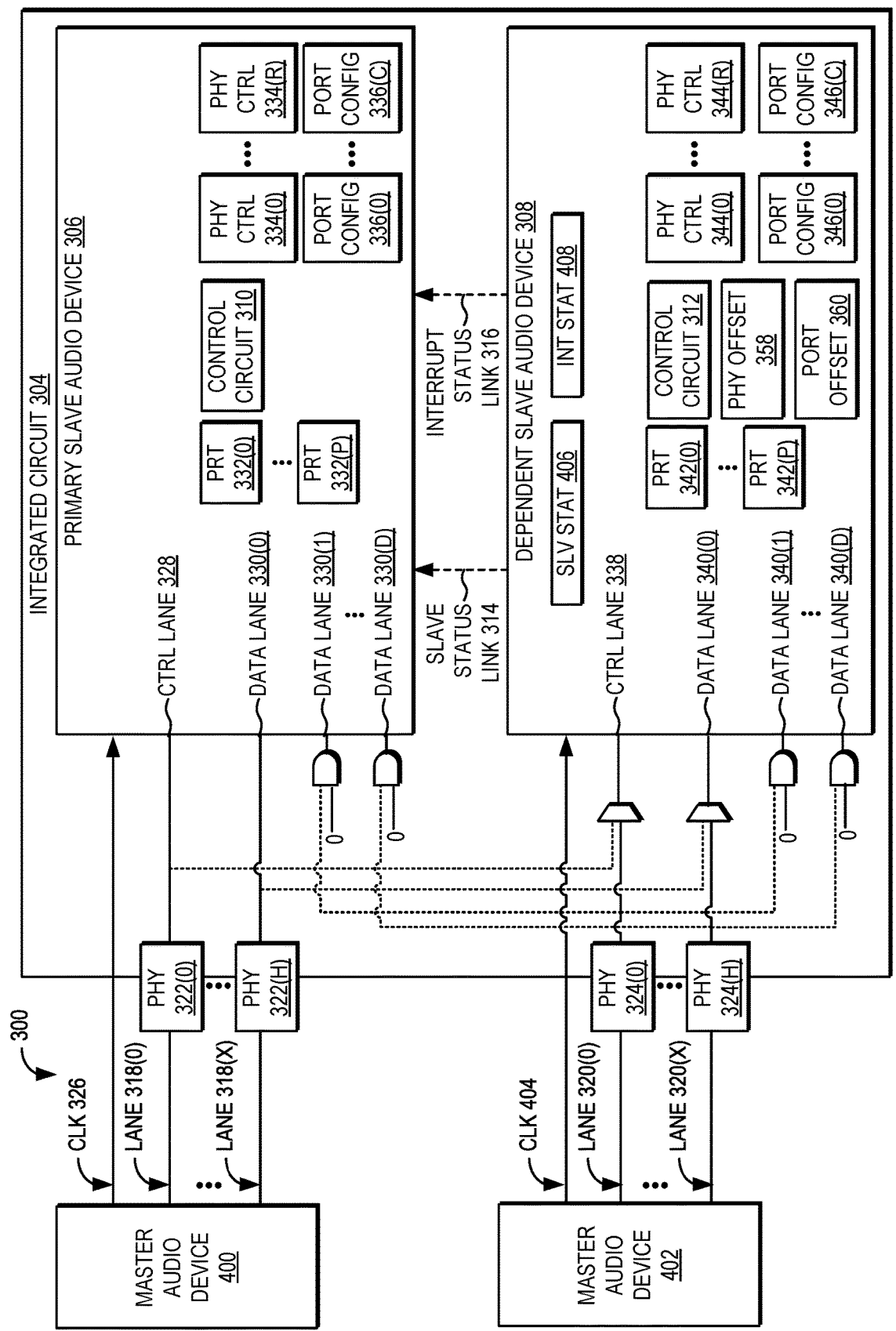
FIG. 4 is a block diagram illustrating the audio system of FIGS. 2A and 2B, in which the primary slave audio device and the dependent slave audio device, configured to operate in a detach mode, communicate with separate master audio devices using separate audio bus interfaces, according to some aspects.

FIG. 4 is a block diagram illustrating the audio system 300 of FIG. 3, in which the primary slave audio device 306 and the dependent slave audio device 308 are configured to operate in a detach mode. In the detach mode, the primary slave audio device 306 is configured to communicate with a first master audio device 400, while the dependent slave audio device 308 is configured to communicate with a second master audio device 402. The dependent slave audio device 308 receives a separate clock signal (not shown) from a clock line 404. The communication lane 320(0) operates as the control lane 338 for the dependent slave audio device 308, while the communication lane 320(X) operates as the data lane 340(0) of the plurality of data lanes 340(0)-340(D) for the dependent slave audio device 308.

The slave status link 314 and the interrupt status link 316 are both inactive when in the detach mode, and thus the primary slave audio device 306 and the dependent slave audio device 308 each communicate slave statuses and interrupt statuses directly to the corresponding master audio devices 400 and 402. Thus, the control circuit 312 of the dependent slave audio device 308 may transmit a slave status (captioned as "SLV STAT" in FIG. 4) 406 for the dependent slave audio device 308 to the master audio device 402 via the control lane 338 of the dependent slave audio device 308, and may also transmit an interrupt status (captioned as "INT STAT" in FIG. 4) 408 for the dependent slave audio device 308 to the master audio device 302 via the control lane 338. While operating in the detach mode, the control circuit 312 of some aspects of the dependent slave audio device 308 may also configure each of the port offset 360 and the physical layer offset 358 to a value of zero (0).

Figure 5A:
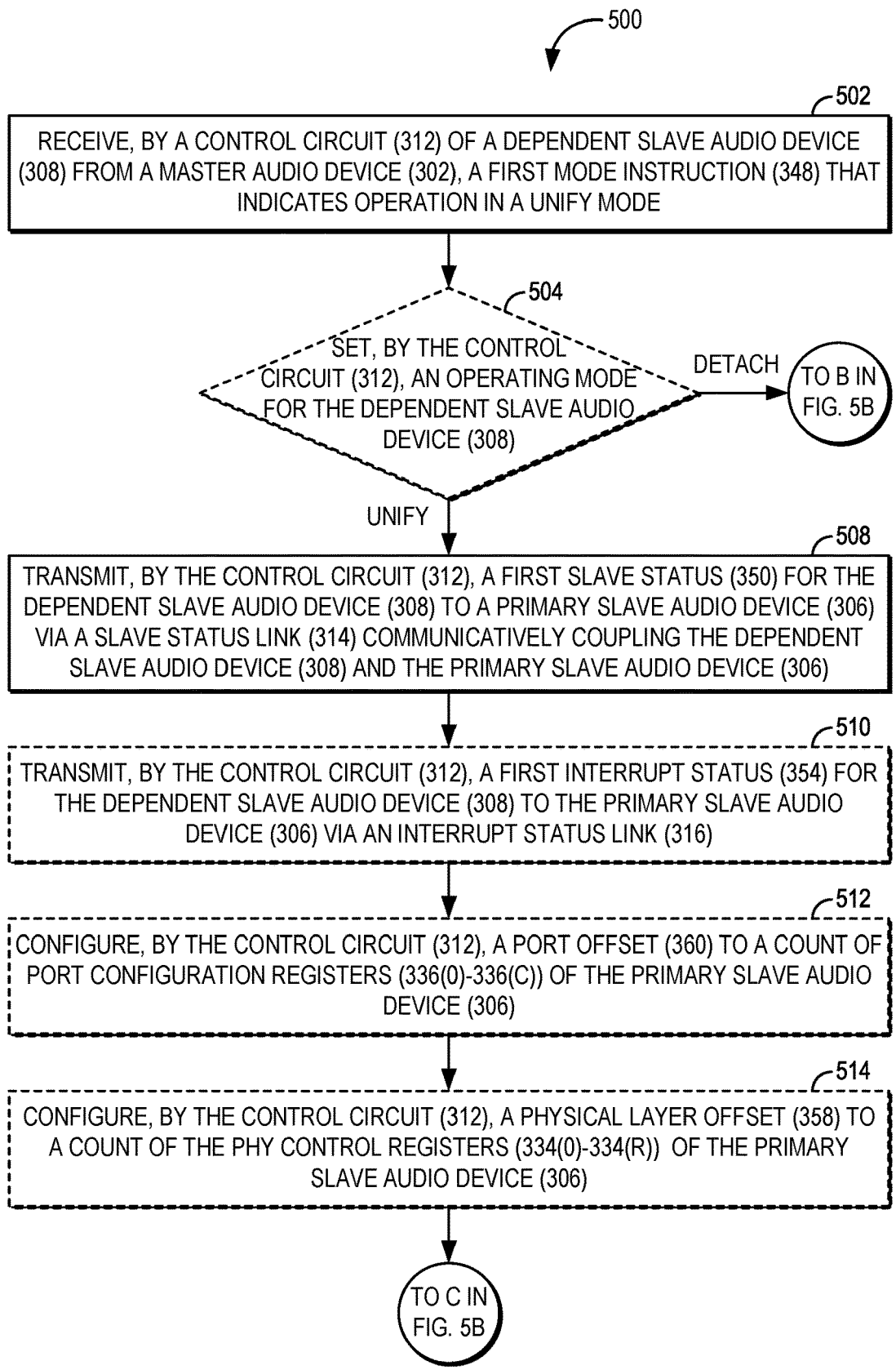
FIGS. 5A and 5B illustrate exemplary operations performed by the dependent slave audio device of FIGS. 3 and 4 when operating in the unify mode and in the detach mode, according to some aspects.
Figure 5B:
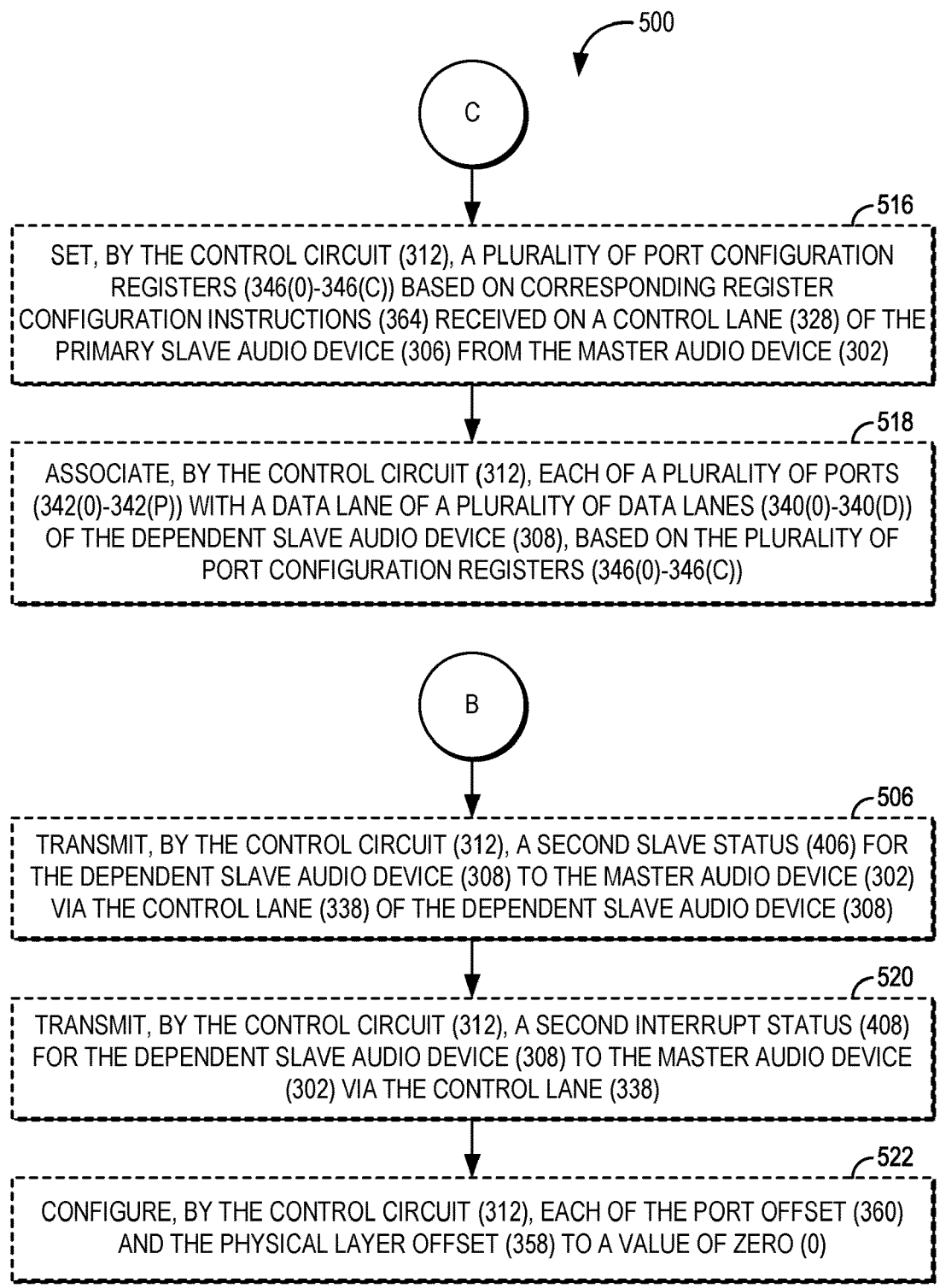

To illustrate exemplary operations performed by the dependent slave audio device 308 of FIGS. 3 and 4 when operating in the unify mode and in the detach mode according to some aspects, FIGS. 5A and 5B provide a flowchart showing exemplary operations 500. Elements of FIGS. 3 and 4 are referenced in describing FIGS. 5A and 5B for the sake of clarity. It is to be understood that some of the operations 500 shown in FIGS. 5A and 5B may be performed in an order other than that illustrated herein, and/or may be omitted in some aspect.

The operations 500 begin in FIG. 5A with a control circuit (e.g., the control circuit 312 of FIGS. 3 and 4) of a dependent slave audio device (e.g., the dependent slave audio device 308 of FIGS. 3 and 4) receiving, from a master audio device, such as the master audio device 302 of FIGS. 3 and 4, a first mode instruction (e.g., the mode instruction 348 of FIG. 3) that indicates operation in a unify mode (block 502). The control circuit 312 then sets an operating mode for the dependent slave audio device 308 (block 504). If the control circuit 312 at block 504 sets the operating mode to a detach mode, the operations 500 continue at block 506 of FIG. 5B. If the control circuit 312 at block 504 sets the operating mode to a unify mode, the operations 500 continue at block 508 of FIG. 5A.

While the dependent slave audio device 308 is operating in the unify mode, the control circuit 312 transmits a first slave status (e.g., the slave status 350 of FIG. 3) for the dependent slave audio device 308 to a primary slave audio device (e.g., the primary slave audio device 306 of FIGS. 3 and 4) via a slave status link (e.g., the slave status link 314 of FIGS. 3 and 4) communicatively coupling the dependent slave audio device 308 and the primary slave audio device 306 (block 508). In some aspects, the control circuit 312 may transmit a first interrupt status (e.g., the interrupt status 354 of FIG. 3) for the dependent slave audio device 308 to the primary slave audio device 306 via an interrupt status link, such as the interrupt status link 316 of FIGS. 3 and 4 (block 510).

Some aspects may provide that, while operating in the unify mode, the control circuit 312 may configure a port offset (e.g., the port offset 360) to a count of port configuration registers (e.g., the port configuration registers 336(0)-336(C) of FIGS. 3 and 4) of the primary slave audio device 306 (block 512). The control circuit 312 may also configure a physical layer offset (e.g., the physical layer offset 358 of FIGS. 3 and 4) to a count of PHY control registers (e.g., the PHY control registers 334(0)-334(R) of FIGS. 3 and 4) of the primary slave audio device 306 (block 514). In this manner, the PHY control registers 344(0)-344(R) and the port configuration registers 346(0)-346(C) of the dependent slave audio device 308 appear to the master audio device 302 to be contiguous with the PHY control registers 334(0)-334(R) and the port configuration registers 336(0)-336(C), respectively, of the primary slave audio device 306 when operating in the unify mode. The operations 500 in some aspects may continue at block 516 of FIG. 5B.

Turning now to FIG. 5B, the operations 500 according to some aspects may continue with the control circuit 312 setting the plurality of port configuration registers 346(0)-346(C) based on corresponding register configuration instructions (e.g., the register configuration instructions 364 of FIG. 3) received on a control lane (e.g., the control lane 328 of FIGS. 3 and 4) of the primary slave audio device 306 from the master audio device 302 (block 516). The control circuit 312 may then associate a plurality of ports (e.g., the ports 342(0)-342(P) of FIGS. 3 and 4) with a data lane of a plurality of data lanes (e.g., the plurality of data lanes 340(0)-340(D) of FIGS. 3 and 4) of the dependent slave audio device 308, based on the plurality of port configuration registers 346(0)-346(C) (block 518).

If the control circuit 312 at block 504 of FIG. 5A sets the operating mode for the dependent slave audio device 308 to a detach mode, the control circuit 312, while operating in the detach mode, transmits a second slave status (e.g., the slave status 406 of FIG. 4) for the dependent slave audio device 308 to the master audio device 302 via the control lane 338 of the dependent slave audio device 308 (block 506). The control circuit 312 may also transmit a second interrupt status (e.g., the interrupt status 408 of FIG. 4) for the dependent slave audio device 308 to the master audio device 302 via the control lane 338 (block 520). In some aspects, the control circuit 312 while operating in the detach mode may configure each of the port offset 360 and the physical layer offset 358 to a value of zero (0) (block 522).

Figure 6A:
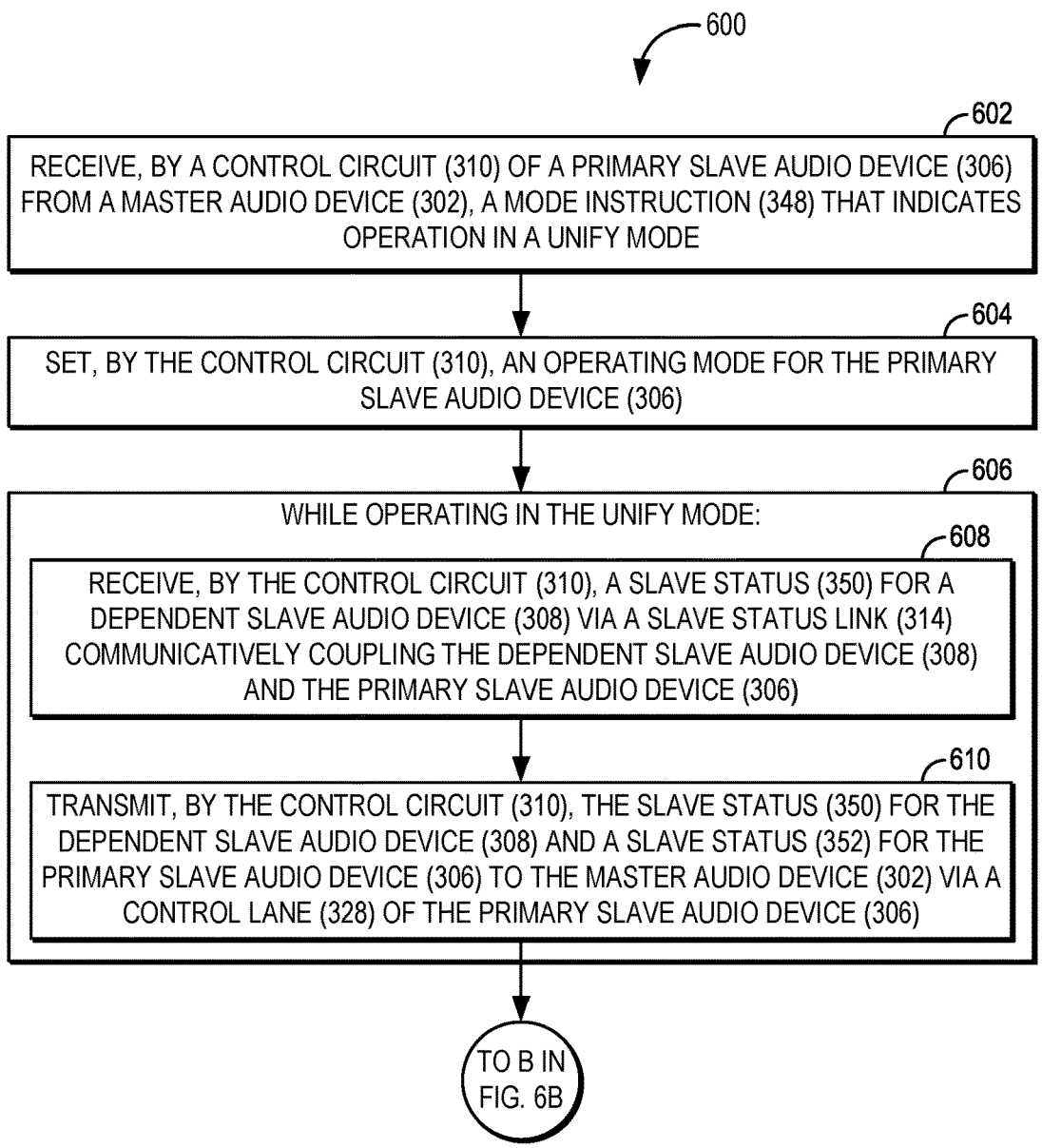
FIGS. 6A and 6B illustrate exemplary operations performed by the primary slave audio device of FIGS. 3 and 4 when operating in the unify mode, according to some aspects.
Figure 6B:
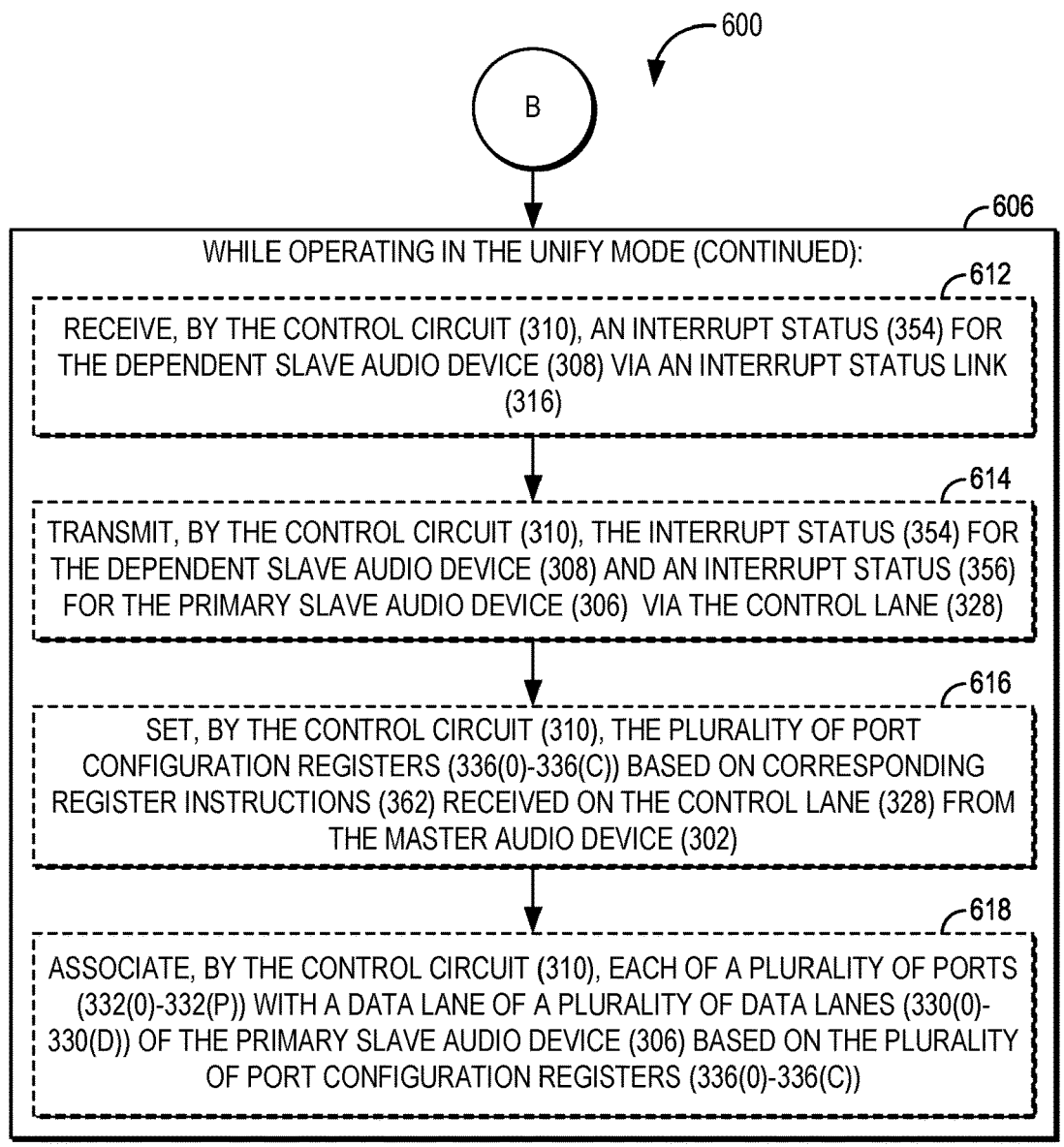

FIGS. 6A and 6B provide a flowchart illustrating exemplary operations 600 performed by the primary slave audio device 306 of FIGS. 3 and 4 when operating in the unify mode, according to some aspects. For the sake of clarity, elements of FIGS. 3 and 4 are referenced in describing FIGS. 6A and 6B. It is to be understood that some of the operations 600 shown in FIGS. 6A and 6B may be performed in an order other than that illustrated herein, and/or may be omitted in some aspect. In FIG. 6A, the operations 600 begin with a control circuit, such as the control circuit 310 of FIGS. 3 and 4, of the primary slave audio device 306 receiving, from a master audio device (e.g., the master audio device 302 of FIGS. 3 and 4), a mode instruction (e.g., the mode instruction 348 of FIG. 3) that indicates operation in a unify mode (block 602). In response, the control circuit 310 sets an operating mode for the primary slave audio device 306 (i.e., to a unify mode) (block 604).

While operating in the unify mode, the control circuit 310 of primary slave audio device 306 performs a series of operations (block 606). The control circuit 310 receives a slave status (e.g., the slave status 350 of FIG. 3) for a dependent slave audio device (e.g., the dependent slave audio device 308 of FIGS. 3 and 4) via a slave status link (e.g., the slave status link 314 of FIGS. 3 and 4) communicatively coupling the dependent slave audio device 308 and the primary slave audio device 306 (block 608). The control circuit 310 subsequently transmits the slave status 350 for the dependent slave audio device 308 and a slave status (e.g., the slave status 352 of FIG. 3) for the primary slave audio device 306 to the master audio device 302 via a control lane (e.g., the control lane 328 of FIGS. 3 and 4) of the primary slave audio device 306 (block 610). The operations 600 in some aspects may continue at block 612 of FIG. 6B.

Referring now to FIG. 6B, the operations performed by the primary slave audio device 306 while in the unify mode continue (block 606). In some aspects, the control circuit 310 may receive an interrupt status (e.g., the interrupt status 354 of FIG. 3) for the dependent slave audio device 308 via an interrupt status link (e.g., the interrupt status link 316 of FIGS. 3 and 4) (block 612). The control circuit 310 subsequently transmits the interrupt status 354 for the dependent slave audio device 308 and an interrupt status (e.g., the interrupt status 356 of FIG. 3) for the primary slave audio device 306 via the control lane 328 (block 614). Some aspects may provide that the control circuit 310 sets a plurality of port configuration registers (e.g., the port configuration registers 336(0)-336(C) of FIGS. 3 and 4) based on corresponding register configuration instructions (e.g., the register configuration instructions 362 of FIG. 3) received on the control lane 328 from the master audio device 302 (block 616). The control circuit 310 may then associate each of a plurality of ports (e.g., the ports 332(0)-332(P) of FIGS. 3 and 4) with a data lane of a plurality of data lanes (e.g., the data lanes 330(0)-330(D) of FIGS. 3 and 4) of the primary slave audio device 306 based on the plurality of port configuration registers 336(0)-336(C) (block 618).

Thus, exemplary aspects of the present disclosure provide a way to unify or detach slave audio devices such as SOUNDWIRE devices, which enables support for different computing platform requirements without incurring additional physical area or power consumption.

The systems and methods for unifying multiple audio bus interfaces in an audio system according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 7A:
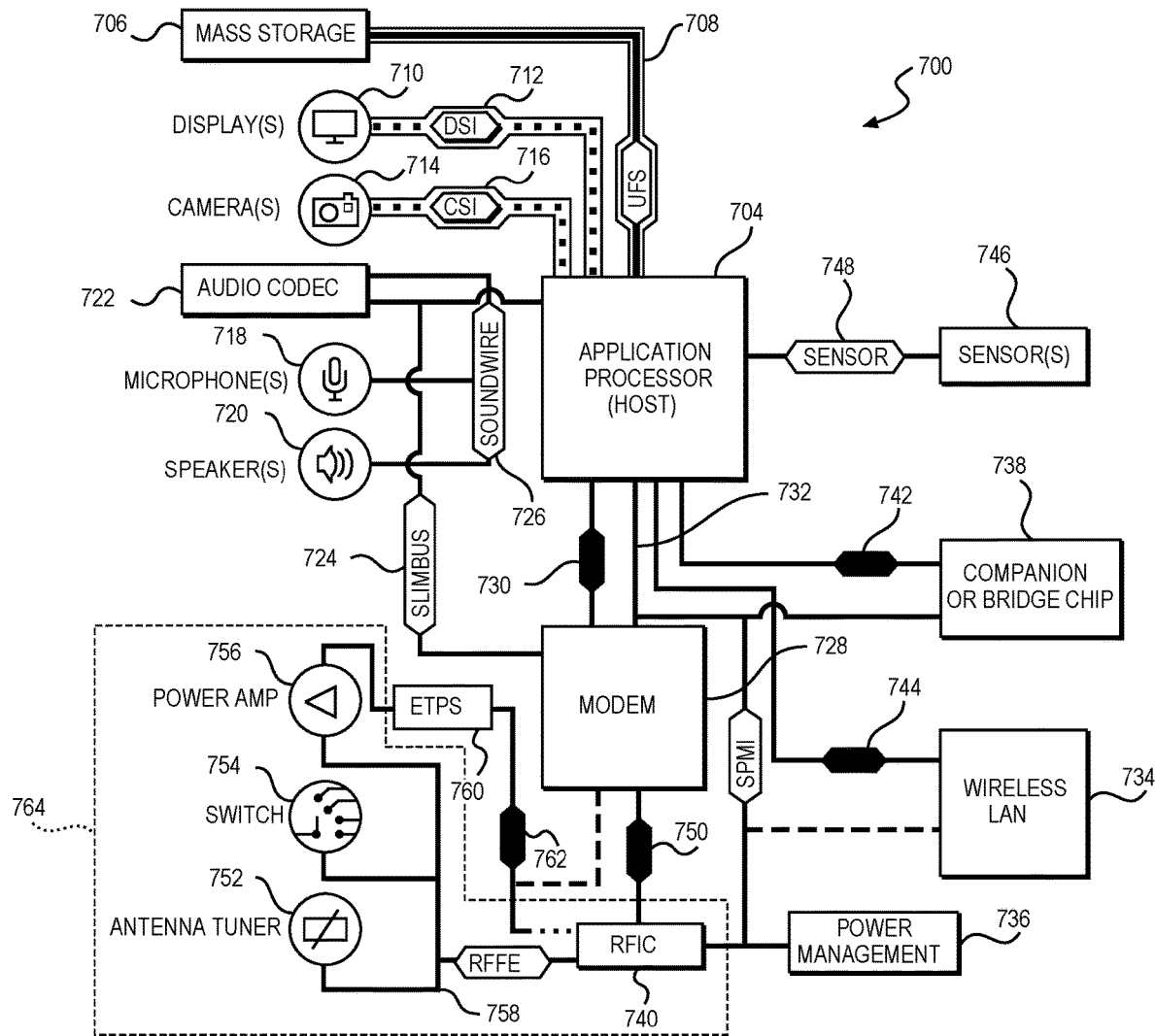
FIGS. 7A-7C are block diagrams of exemplary processor-based systems that can include the audio systems of FIGS. 3 and 4.
Figure 7B:
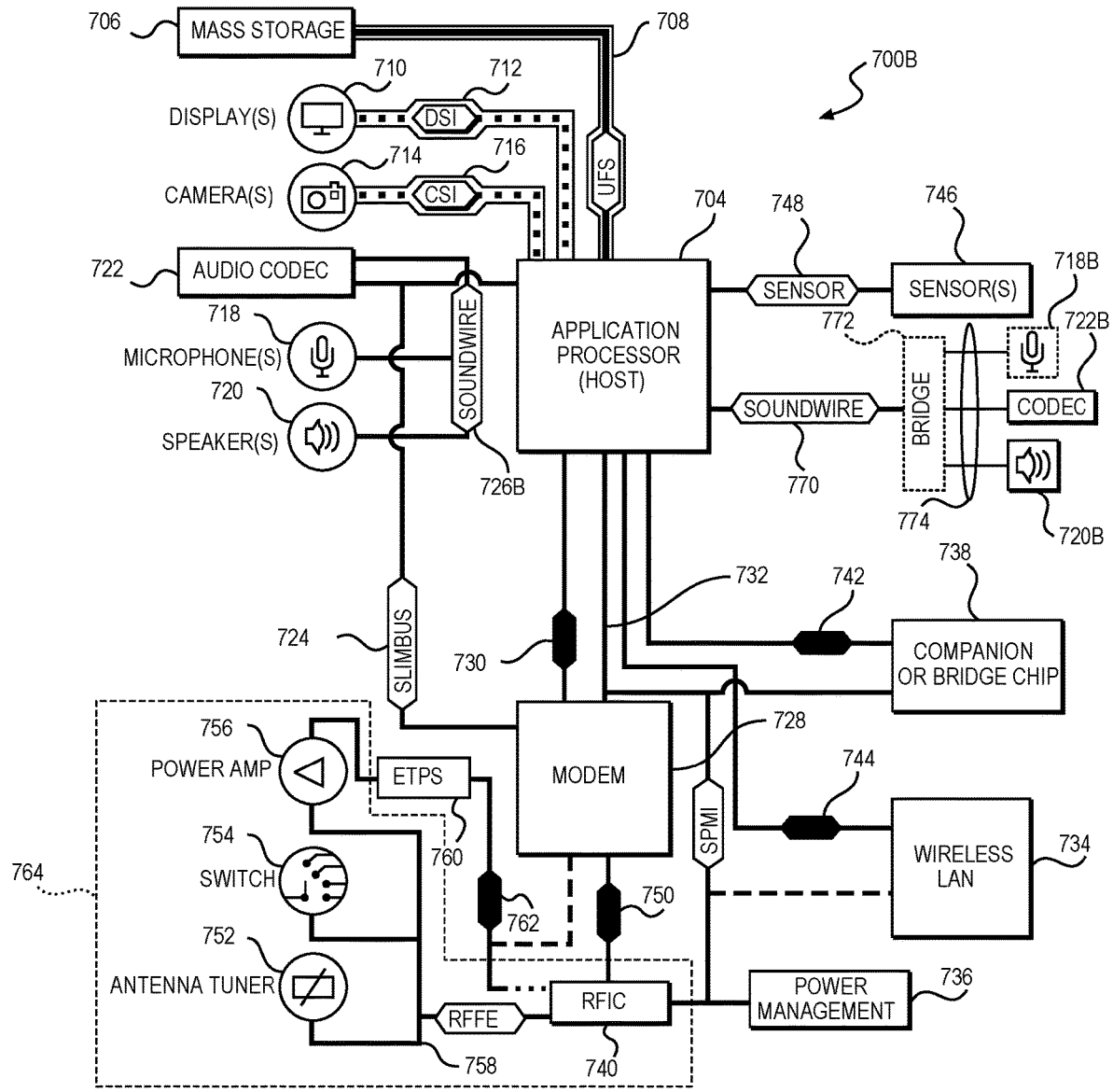
Figure 7C:
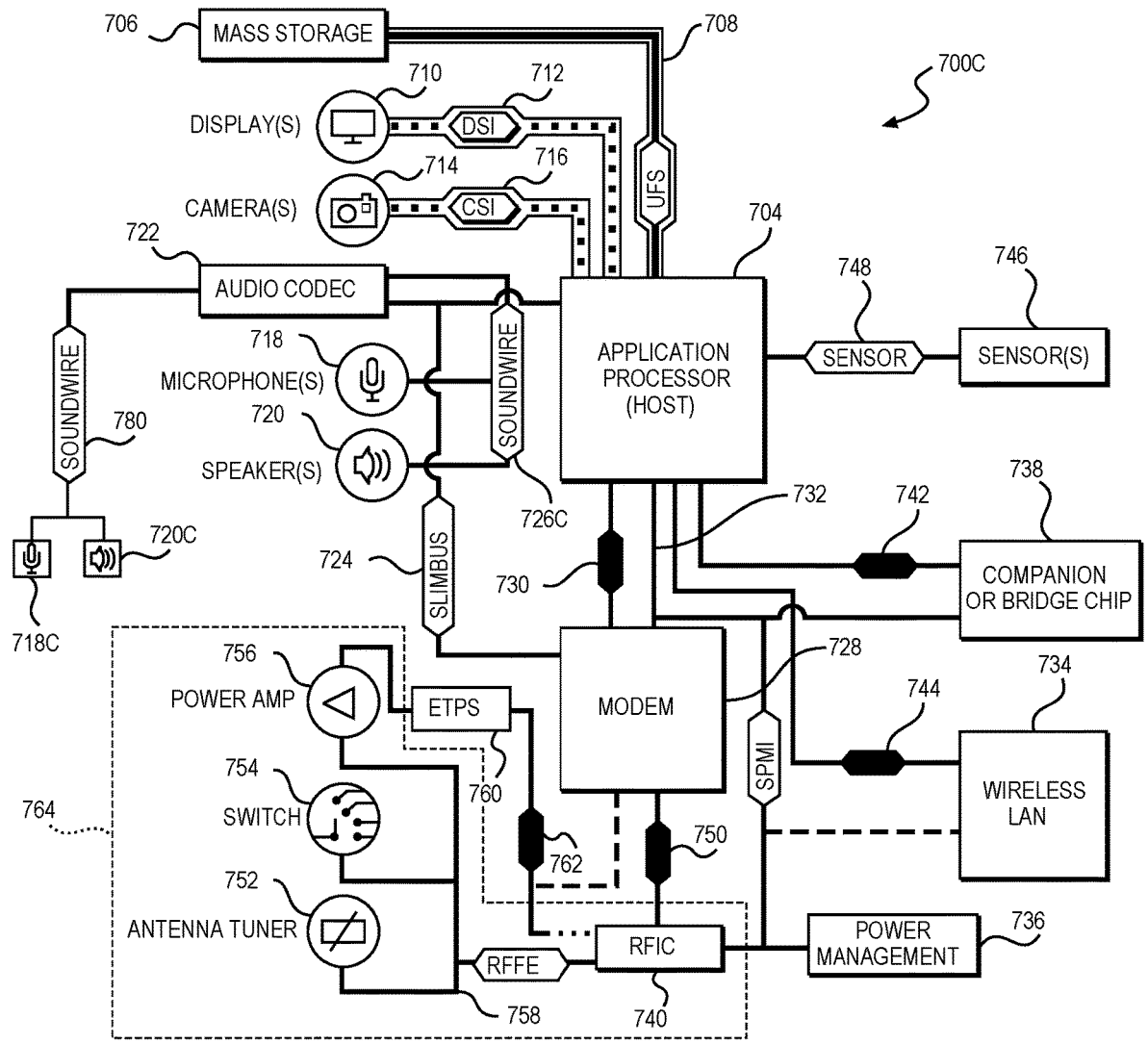

Exemplary aspects of the present disclosure are well suited for use with a SOUNDWIRE bus, although other differential audio buses may also benefit from concepts disclosed herein. As used herein, reference to SOUNDWIRE means reference to SOUNDWIRE-13S version v0.4r27 and its finalized version. There are a variety of locations in a computing device at which a SOUNDWIRE bus may be incorporated. In this regard, FIGS. 7A-7C illustrate various placements in some exemplary aspects. In most instances, the overall architecture is the same.

FIG. 7A provides a system-level block diagram of an exemplary mobile terminal 700 such as a smart phone, mobile computing device tablet, or the like. The mobile terminal 700 includes an application processor 704 (sometimes referred to as a host) that communicates with a mass storage element 706 through a universal flash storage (UFS) bus 708. The application processor 704 may further be connected to a display 710 through a display serial interface (DSI) bus 712 and a camera 714 through a camera serial interface (CSI) bus 716. Various audio elements, such as a microphone 718, a speaker 720, and an audio codec 722, may be coupled to the application processor 704 through a serial low-power inter-chip multimedia bus (SLIMbus) 724. Additionally, the audio elements may communicate with each other and the audio codec 722 through the SOUND-WIRE bus 726. A modem 728 may also be coupled to the SLIMbus 724. The modem 728 may further be connected to the application processor 704 through a peripheral component interconnect (PCI) or PCI express (PCIe) bus 730 and/or a system power management interface (SPMI) bus 732. Note that the SLIMbus 724 may be replaced by a SOUNDWIRE bus in some implementations.

The SPMI bus 732 of FIG. 7A may also be coupled to a wireless local area network (WLAN) integrated circuit (IC) (WLAN IC) 734, a power management integrated circuit (PMIC) 736, a companion integrated circuit (sometimes referred to as a bridge chip) 738, and a radio frequency integrated circuit (RFIC) 740. It should be appreciated that separate PCI buses 742 and 744 may also couple the application processor 704 to the companion integrated circuit 738 and the WLAN IC 734. The application processor 704 may further be connected to sensors 746 through a sensor bus 748. The modem 728 and the RFIC 740 may communicate using a bus 750.

As seen in FIG. 7A, the RFIC 740 may couple to one or more radio frequency front end (RFFE) elements, such as an antenna tuner 752, a switch 754, and a power amplifier 756 through an RFFE bus 758. Additionally, the RFIC 740 may couple to an envelope tracking power supply (ETPS) 760 through a bus 762, and the ETPS 760 may communicate with the power amplifier 756. Collectively, the RFFE elements, including the RFIC 740, may be considered an RFFE system 764.

FIG. 7B illustrates an alternate placement of the SOUND-WIRE NEXT bus according to some exemplary aspects. While the majority of the elements are the same as the mobile terminal 700, the mobile terminal 700B illustrated in FIG. 7B has a SOUNDWIRE bus 726B coupling the audio codec 722 to the microphone(s) 718 and the speaker(s) 720. The application processor 704 may be coupled to a SOUND-WIRE NEXT bus 770 that may couple to an optional bridge 772. If the bridge 772 is present, then the bus 774 may be a SOUNDWIRE bus. If the bridge 772 is not present, then the SOUNDWIRE NEXT bus 770 may couple directly to microphones 718B, speakers 720B, and/or an audio codec 722B.

Similarly, FIG. 7C illustrates another alternate placement of the SOUNDWIRE NEXT bus according to some exemplary aspects. In the mobile terminal 700C, the audio codec 722 may couple to a SOUNDWIRE bus 726C and a SOUNDWIRE NEXT bus 780. The SOUNDWIRE NEXT bus 780 may couple to microphones 718C and speakers 720C.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master audio devices and slave audio devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. An integrated circuit (IC), comprising:
    a primary slave audio device, comprising:
        a first control circuit; and
        a first audio bus interface comprising a first control lane and a first plurality of data lanes;
    a dependent slave audio device, comprising:
        a second control circuit; and
        a second audio bus interface comprising a second control lane and a second plurality of data lanes;
    the primary slave audio device and the dependent slave audio device communicatively coupled via a slave status link;
    the first control circuit and the second control circuit each configured to receive, from a master audio device, a mode instruction that indicates operation in one of a detach mode and a unify mode; and
    the second control circuit configured to:
        while operating in the detach mode, transmit a slave status for the dependent slave audio device to the master audio device via the second control lane; and
        while operating in the unify mode, transmit the slave status for the dependent slave audio device to the primary slave audio device via the slave status link.

2. The IC of clause 1, wherein the first control circuit is configured to, while operating in the unify mode:
    receive the slave status for the dependent slave audio device via the slave status link; and
    transmit the slave status for the dependent slave audio device and a slave status for the primary slave audio device to the master audio device via the first control lane.

3. The IC of any one of clauses 1-2, wherein:
    the primary slave audio device and the dependent slave audio device are further communicatively coupled via an interrupt status link; and
    the second control circuit is configured to:
        while operating in the detach mode, transmit an interrupt status for the dependent slave audio device to the master audio device via the second control lane; and
        while operating in the unify mode, transmit the interrupt status for the dependent slave audio device to the primary slave audio device via the interrupt status link.

4. The IC of clause 3, wherein the first control circuit is further configured to, while operating in the unify mode:
    receive the interrupt status for the dependent slave audio device via the interrupt status link; and
    transmit the interrupt status for the dependent slave audio device and an interrupt status for the primary slave audio device to the master audio device via the first control lane.

5. The IC of any one of clauses 1-4, wherein:
    the dependent slave audio device is associated with a port offset and a physical layer offset; and
    the second control circuit is configured to:
        while operating in the detach mode, configure each of the port offset and the physical layer offset to a value of zero (0); and
        while operating in the unify mode:
            configure the port offset to a count of port configuration registers of the primary slave audio device; and
            configure the physical layer offset to a count of physical layer control registers of the primary slave audio device.

6. The IC of any one of clauses 1-5, wherein:
    the primary slave audio device further comprises a first plurality of ports and a first plurality of port configuration registers;
    the dependent slave audio device further comprises a second plurality of ports and a second plurality of port configuration registers;
    the first control circuit is configured to, while operating in the unify mode, associate each of the first plurality of ports with a data lane of the first plurality of data lanes based on the first plurality of port configuration registers; and the second control circuit is configured to, while operating in the unify mode, associate each of the second plurality of ports with a data lane of the second plurality of data lanes based on the second plurality of port configuration registers.

7. The IC of clause 6, wherein:
the first control circuit is configured to, while operating in the unify mode, set the first plurality of port configuration registers based on first corresponding register configuration instructions received on the first control lane from the master audio device; and
the second control circuit is configured to, while operating in the unify mode, set the second plurality of port configuration registers based on second corresponding register configuration instructions received on the first control lane from the master audio device.

8. The IC of any one of clauses 1-7, wherein the master audio device, the primary slave audio device, and the dependent slave audio device each comprise a SOUND-WIRE-I3S audio device.

9. The IC of clause 8, wherein:
the primary slave audio device comprises a microphone device; and
the dependent slave audio device comprises a speaker device.

10. The IC of any one of clauses 1-9, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

11. A method for unifying multiple audio bus interfaces, comprising:
receiving, by a control circuit of a dependent slave audio device from a master audio device, a first mode instruction that indicates operation in a unify mode; and
while operating in the unify mode, transmitting, by the control circuit, a first slave status for the dependent slave audio device to a primary slave audio device via a slave status link communicatively coupling the dependent slave audio device and the primary slave audio device.

12. The method of clause 11, wherein:
the dependent slave audio device and the primary slave audio device are further communicatively coupled via an interrupt status link; and
the method further comprises, while operating in the unify mode, transmitting, by the control circuit, a first interrupt status for the dependent slave audio device to the primary slave audio device via the interrupt status link.

13. The method of any one of clauses 11-12, wherein:
the dependent slave audio device is associated with a port offset and a physical layer offset; and
the method further comprises, while operating in the unify mode:
configuring, by the control circuit, the port offset to a count of port configuration registers of the primary slave audio device; and
configuring, by the control circuit, the physical layer offset to a count of physical layer control registers of the primary slave audio device.

14. The method of clause any one of clauses 11-13, wherein:
the dependent slave audio device further comprises a plurality of ports and a plurality of port configuration registers; and
the method further comprises, while operating in the unify mode, associating, by the control circuit, each of the plurality of ports with a data lane of a plurality of data lanes of the dependent slave audio device, based on the plurality of port configuration registers.

15. The method of clause 14, further comprising, while operating in the unify mode, setting, by the control circuit, the plurality of port configuration registers based on corresponding register configuration instructions received on a control lane of the primary slave audio device from the master audio device.

16. The method of any one of clauses 11-15, further comprising:
receiving, by the control circuit from the master audio device, a second mode instruction that indicates operation in a detach mode; and
while operating in the detach mode, transmitting, by the control circuit, a second slave status for the dependent slave audio device to the master audio device via a control lane of the dependent slave audio device.

17. The method of clause 16, wherein:
the dependent slave audio device and the primary slave audio device are further communicatively coupled via an interrupt status link; and
the method further comprises, while operating in the detach mode, transmitting, by the control circuit, a second interrupt status for the dependent slave audio device to the master audio device via the control lane.

18. The method of any one of clauses 16-17, wherein:
the dependent slave audio device is associated with a port offset and a physical layer offset; and
the method further comprises, while operating in the detach mode, configuring, by the control circuit, each of the port offset and the physical layer offset to a value of zero (0).

19. A method for unifying multiple audio bus interfaces, comprising:
receiving, by a control circuit of a primary slave audio device from a master audio device, a mode instruction that indicates operation in a unify mode; and
while operating in the unify mode,
receiving, by the control circuit, a slave status for a dependent slave audio device via a slave status link communicatively coupling the dependent slave audio device and the primary slave audio device; and
transmitting, by the control circuit, the slave status for the dependent slave audio device and a slave status for the primary slave audio device to the master audio device via a control lane of the primary slave audio device.

20. The method of clause 19, wherein:
the dependent slave audio device and the primary slave audio device are further communicatively coupled via an interrupt status link; and
the method further comprises, while operating in the unify mode:
receiving, by the control circuit, an interrupt status for the dependent slave audio device via the interrupt status link; and transmitting, by the control circuit, the interrupt status for the dependent slave audio device and an interrupt status for the primary slave audio device to the master audio device via the control lane.

21. The method of any one of clauses 19-20, wherein:
the primary slave audio device further comprises a plurality of ports and a plurality of port configuration registers; and
the method further comprises, while operating in the unify mode, associating, by the control circuit, each of the plurality of ports with a data lane of a plurality of data lanes of the primary slave audio device based on the plurality of port configuration registers.

22. The method of clause 21, further comprising, while operating in the unify mode, setting, by the control circuit, the plurality of port configuration registers based on corresponding register configuration instructions received on the control lane from the master audio device.

What is claimed is:

1. An integrated circuit (IC), comprising:
   a primary slave audio device, comprising:
      a first control circuit; and
      a first audio bus interface comprising a first control lane and a first plurality of data lanes;
   a dependent slave audio device, comprising:
      a second control circuit; and
      a second audio bus interface comprising a second control lane and a second plurality of data lanes;
   the primary slave audio device and the dependent slave audio device communicatively coupled via a slave status link;
   the first control circuit and the second control circuit each configured to receive, from a master audio device, a mode instruction that indicates operation in one of a detach mode and a unify mode; and
   the second control circuit configured to:
      while operating in the detach mode, transmit a slave status for the dependent slave audio device to the master audio device via the second control lane; and
      while operating in the unify mode, transmit the slave status for the dependent slave audio device to the primary slave audio device via the slave status link.

2. The IC of claim 1, wherein the first control circuit is configured to, while operating in the unify mode:
   receive the slave status for the dependent slave audio device via the slave status link; and
   transmit the slave status for the dependent slave audio device and a slave status for the primary slave audio device to the master audio device via the first control lane.

3. The IC of claim 1, wherein:
   the primary slave audio device and the dependent slave audio device are further communicatively coupled via an interrupt status link; and
   the second control circuit is configured to:
      while operating in the detach mode, transmit an interrupt status for the dependent slave audio device to the master audio device via the second control lane; and
      while operating in the unify mode, transmit the interrupt status for the dependent slave audio device to the primary slave audio device via the interrupt status link.

4. The IC of claim 3, wherein the first control circuit is further configured to, while operating in the unify mode:
   receive the interrupt status for the dependent slave audio device via the interrupt status link; and
   transmit the interrupt status for the dependent slave audio device and an interrupt status for the primary slave audio device to the master audio device via the first control lane.

5. The IC of claim 1, wherein:
   the dependent slave audio device is associated with a port offset and a physical layer offset; and
   the second control circuit is configured to:
      while operating in the detach mode, configure each of the port offset and the physical layer offset to a value of zero (0); and
      while operating in the unify mode:
         configure the port offset to a count of port configuration registers of the primary slave audio device; and
         configure the physical layer offset to a count of physical layer control registers of the primary slave audio device.

6. The IC of claim 1, wherein:
   the primary slave audio device further comprises a first plurality of ports and a first plurality of port configuration registers;
   the dependent slave audio device further comprises a second plurality of ports and a second plurality of port configuration registers;
   the first control circuit is configured to, while operating in the unify mode, associate each of the first plurality of ports with a data lane of the first plurality of data lanes based on the first plurality of port configuration registers; and
   the second control circuit is configured to, while operating in the unify mode, associate each of the second plurality of ports with a data lane of the second plurality of data lanes based on the second plurality of port configuration registers.

7. The IC of claim 6, wherein:
   the first control circuit is configured to, while operating in the unify mode, set the first plurality of port configuration registers based on first corresponding register configuration instructions received on the first control lane from the master audio device; and
   the second control circuit is configured to, while operating in the unify mode, set the second plurality of port configuration registers based on second corresponding register configuration instructions received on the first control lane from the master audio device.

8. The IC of claim 1, wherein the master audio device, the primary slave audio device, and the dependent slave audio device each comprise a SOUNDWIRE-13S audio device.

9. The IC of claim 8, wherein:
   the primary slave audio device comprises a microphone device; and
   the dependent slave audio device comprises a speaker device.

10. The IC of claim 1, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

11. A method for unifying multiple audio bus interfaces, comprising:
    receiving, by a control circuit of a dependent slave audio device from a master audio device, a first mode instruction that indicates operation in a unify mode; and
    while operating in the unify mode, transmitting, by the control circuit, a first slave status for the dependent slave audio device to a primary slave audio device via a slave status link communicatively coupling the dependent slave audio device and the primary slave audio device.

12. The method of claim 11, wherein:
the dependent slave audio device and the primary slave audio device are further communicatively coupled via an interrupt status link; and
the method further comprises, while operating in the unify mode, transmitting, by the control circuit, a first interrupt status for the dependent slave audio device to the primary slave audio device via the interrupt status link.

13. The method of claim 11, wherein:
the dependent slave audio device is associated with a port offset and a physical layer offset; and
the method further comprises, while operating in the unify mode:
    configuring, by the control circuit, the port offset to a count of port configuration registers of the primary slave audio device; and
    configuring, by the control circuit, the physical layer offset to a count of physical layer control registers of the primary slave audio device.

14. The method of claim 11, wherein:
the dependent slave audio device further comprises a plurality of ports and a plurality of port configuration registers; and
the method further comprises, while operating in the unify mode, associating, by the control circuit, each of the plurality of ports with a data lane of a plurality of data lanes of the dependent slave audio device, based on the plurality of port configuration registers.

15. The method of claim 14, further comprising, while operating in the unify mode, setting, by the control circuit, the plurality of port configuration registers based on corresponding register configuration instructions received on a control lane of the primary slave audio device from the master audio device.

16. The method of claim 11, further comprising:
    receiving, by the control circuit from the master audio device, a second mode instruction that indicates operation in a detach mode; and
    while operating in the detach mode, transmitting, by the control circuit, a second slave status for the dependent slave audio device to the master audio device via a control lane of the dependent slave audio device.

17. The method of claim 16, wherein:
the dependent slave audio device and the primary slave audio device are further communicatively coupled via an interrupt status link; and
the method further comprises, while operating in the detach mode, transmitting, by the control circuit, a second interrupt status for the dependent slave audio device to the master audio device via the control lane.

18. The method of claim 16, wherein:
the dependent slave audio device is associated with a port offset and a physical layer offset; and
the method further comprises, while operating in the detach mode, configuring, by the control circuit, each of the port offset and the physical layer offset to a value of zero (0).

19. A method for unifying multiple audio bus interfaces, comprising:
    receiving, by a control circuit of a primary slave audio device from a master audio device, a mode instruction that indicates operation in a unify mode; and
    while operating in the unify mode,
        receiving, by the control circuit, a slave status for a dependent slave audio device via a slave status link communicatively coupling the dependent slave audio device and the primary slave audio device; and
        transmitting, by the control circuit, the slave status for the dependent slave audio device and a slave status for the primary slave audio device to the master audio device via a control lane of the primary slave audio device.

20. The method of claim 19, wherein:
the dependent slave audio device and the primary slave audio device are further communicatively coupled via an interrupt status link; and
the method further comprises, while operating in the unify mode:
    receiving, by the control circuit, an interrupt status for the dependent slave audio device via the interrupt status link; and
    transmitting, by the control circuit, the interrupt status for the dependent slave audio device and an interrupt status for the primary slave audio device to the master audio device via the control lane.

21. The method of claim 19, wherein:
the primary slave audio device further comprises a plurality of ports and a plurality of port configuration registers; and
the method further comprises, while operating in the unify mode, associating, by the control circuit, each of the plurality of ports with a data lane of a plurality of data lanes of the primary slave audio device based on the plurality of port configuration registers.

22. The method of claim 21, further comprising, while operating in the unify mode, setting, by the control circuit, the plurality of port configuration registers based on corresponding register configuration instructions received on the control lane from the master audio device.

\* \* \* \* \*